(12) United States Patent
Wen et al.

(10) Patent No.: US 9,731,243 B2
(45) Date of Patent: Aug. 15, 2017

(54) LOW PRESSURE RE-ABSORBER AND ITS INTEGRATION WITH SULFUR-RICH SOLVENT FLASH DRUM OR SULFUR-RICH SOLVENT STRIPPER IN AN ABSORPTION UNIT

(71) Applicant: UOP LLC, Des Plaines, IL (US)

(72) Inventors: Xiaoming Wen, Palatine, IL (US); Edward P. Zbacnik, Fox River Grove, IL (US); Saadet Ulas Acikgoz, Des Plaines, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 258 days.

(21) Appl. No.: 14/741,510

(22) Filed: Jun. 17, 2015

(65) Prior Publication Data
US 2015/0375163 A1    Dec. 31, 2015

Related U.S. Application Data

(60) Provisional application No. 62/019,373, filed on Jun. 30, 2014.

(51) Int. Cl.
*B01D 53/14* (2006.01)
*B01D 53/62* (2006.01)

(52) U.S. Cl.
CPC ..... *B01D 53/1406* (2013.01); *B01D 53/1425* (2013.01); *B01D 53/1462* (2013.01); *B01D 2257/30* (2013.01)

(58) Field of Classification Search
CPC ............ B01D 53/1406; B01D 53/1425; B01D 53/1462; B01D 2257/30; B01D 2257/504
USPC ......... 95/149, 172–174, 177, 186, 204, 223, 95/235, 236; 423/242.1, 243, 1, 220
See application file for complete search history.

(56) References Cited

U.S. PATENT DOCUMENTS

| | | | | |
|---|---|---|---|---|
| 4,242,108 A * | 12/1980 | Nicholas | ............ | B01D 53/1462 95/166 |
| 4,297,330 A * | 10/1981 | Schlauer | ............ | B01D 53/1462 423/232 |
| 4,504,449 A * | 3/1985 | Doerges | ............. | B01D 53/1425 423/226 |
| 4,957,515 A * | 9/1990 | Hegarty | ............. | B01D 53/1418 60/772 |

(Continued)

OTHER PUBLICATIONS

Bhattacharyya, "Constrained nonlinear state estimation of an acid gas removal process as part of an integrated gasification combined cycle (IGCC) power plant with CO2 capture", 2011 AIChE Annual Meeting, Oct. 16-21, 2011; Publisher: American Institute of Engineers (author provided the poster presented at the meeting—no formal paper was published).

(Continued)

Primary Examiner — Frank Lawrence

(57) ABSTRACT

A low pressure re-absorber is integrated with a sulfur-rich solvent flash drum or a sulfur-rich solvent stripping column in a solvent acid gas removal process that provides for sufficient sulfur concentration for the downstream sulfur recovery unit. In another aspect of the invention, carbon dioxide containing or carbon dioxide rich gas streams that are at a lower temperature relative to a lean solvent stream are used to cool those lean solvent streams and then optionally to cool other process streams, to save energy consumption.

11 Claims, 4 Drawing Sheets

(56) References Cited

U.S. PATENT DOCUMENTS

| | | |
|---|---|---|
| 7,708,801 B2 | 5/2010 | Thacker et al. |
| 7,892,324 B2 | 2/2011 | Frydman et al. |
| 8,419,843 B2 | 4/2013 | Frydman et al. |
| 8,435,325 B2 | 5/2013 | Akiyama |
| 8,480,982 B2 * | 7/2013 | Mak .................. B01D 53/1406 422/630 |
| 8,591,631 B2 | 11/2013 | Naphad et al. |
| 2004/0118126 A1 * | 6/2004 | Ong .................. B01D 53/1462 60/780 |
| 2013/0036911 A1 | 2/2013 | Mak |
| 2013/0247766 A1 * | 9/2013 | Oppenheim ....... B01D 53/1406 96/234 |
| 2014/0338395 A1 * | 11/2014 | Oelfke .................. F25J 3/0233 62/620 |
| 2016/0296878 A1 * | 10/2016 | Zhou .................. B01D 53/1462 |

OTHER PUBLICATIONS

Norton, "Reduced pressure increases CO2 recovery", Process Eng. (Land.) (ISSN 0370-1859) V69 N.9 25 (Sep. 1988), v 69, n 9, p. 25, Sep. 1988; ISSN: 03701859; Publisher: Centaur Publishing.

* cited by examiner

LOW PRESSURE RE-ABSORBER AND ITS INTEGRATION WITH SULFUR-RICH SOLVENT FLASH DRUM OR SULFUR-RICH SOLVENT STRIPPER IN AN ABSORPTION UNIT

CROSS-REFERENCE TO RELATED APPLICATION

This application claims priority from Provisional Application No. 62/019,373 filed Jun. 30, 2014, the contents of which are hereby incorporated by reference.

BACKGROUND OF THE INVENTION

The invention relates to removal of acid gases-carbon dioxide ($CO_2$) and sulfur-containing components such as hydrogen sulfide ($H_2S$) and carbonyl sulfide (COS) that are simply referred to as sulfur components or sulfur from a gas mixture that contains acid gases such as synthesis gas (syngas) or natural gas. In a process of acid gas removal by solvent, a specified sulfur concentration in the produced acid gas stream is required by the downstream sulfur recovery unit. To meet the sulfur specification of the acid gas stream, equipment for enriching sulfur content in the acid gas stream, such as sulfur-rich solvent flash drum(s), concentrators with product gas stripping and the combination of the two have been used in acid gas removal units. For example, in US 2013/0036911, a syngas treatment configuration having two flash drums to enrich the acid gas is provided to produce acid gas stream with 40 mol % $H_2S$ or higher as required by a Claus unit for sulfur recovery. The main concept of a re-absorber is that the sulfur content in the sulfur-rich solvent from the bottom of a sulfur absorber is concentrated by stripping off carbon dioxide with stripping gas, such as a flash gas from the overhead of a sulfur-rich solvent flash drum (rich flash gas) and nitrogen, in the bottom part of the re-absorber, which produces a $CO_2$-rich gas (the function of a concentrator), and that the sulfur components in the $CO_2$-rich gas is absorbed by contacting with solvent in the upper part of the re-absorber (the function of re-absorption). The advantage of a re-absorber design over the conventional sulfur-rich solvent flash drum/concentrator design is that the overhead of the re-absorber is vented or sent out as $CO_2$ product instead of being recycled back to the sulfur absorber, which avoids the additional capital and operating costs related to the increase of throughput of the sulfur absorber and the carbon dioxide absorber if so equipped by the recycle gas from the sulfur-rich flash drum/concentrator.

This invention also relates to heat integration in a process of acid gas removal by solvent. In these types of processes, various gas streams containing carbon dioxide can have very low temperatures. The cold gas in those streams can be utilized to cool other process streams in the unit that requires low temperature, such as the lean solvent, to reduce the utilities that are required to cool the other process streams.

SUMMARY OF THE INVENTION

A system and process is provided in which a re-absorber and a sulfur-rich solvent flash drum or a sulfur-rich solvent stripping column are operated at pressures that avoid the use of any compressor to send the overhead of the sulfur-rich solvent flash drum or sulfur-rich solvent stripping column, the rich flash gas, to the re-absorber and provide for considerably lower operating costs. In another aspect of the invention, configurations are provided that maximize the ability to allow various gas streams to heat or cool other streams as necessary and thereby significantly reduce energy requirements.

DETAILED DESCRIPTION OF THE INVENTION

This invention is related to a low pressure re-absorber and its integration with sulfur-rich solvent flash drum or a sulfur-rich solvent stripper in an acid gas removal process with an absorbent solvent such as dimethyl ether of polyethylene glycol, methanol, propylene carbonate and N-methyl-2-pyrrolidone (NMP). In the present application, low pressure means that a compressor is not needed to send the overhead gas of the sulfur-rich solvent flash drum or stripper, the rich flash gas, to the re-absorber.

Figure 1:
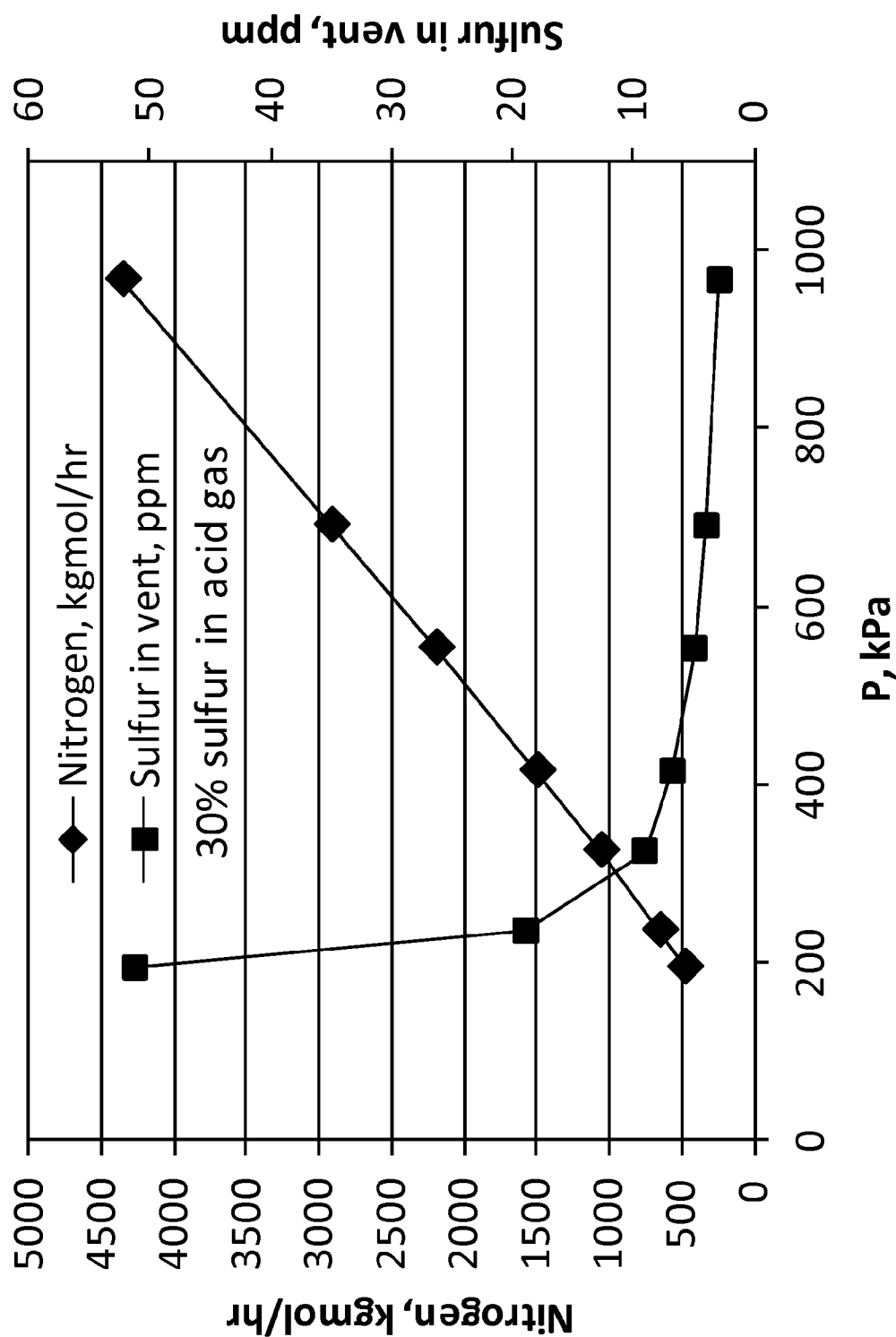
FIG. 1 shows the results of an optimization study on the re-absorber pressure for a specific case.

Optimization studies have been conducted on the re-absorber operating pressure and the integration of re-absorber and sulfur-rich solvent flash drum. With the re-absorber operated at low pressure, any rich flash gas compressor and associated knock-out drum and cooler can be avoided by operating the sulfur-rich solvent flash drum at pressure just higher than the re-absorber pressure to overcome the pressure drop between the overhead of the sulfur-rich solvent flash drum and the re-absorber. It has been shown that an optimized re-absorber operating pressure exists that balances the required nitrogen stripping gas flow rate to meet the sulfur specification in the acid gas stream and the required solvent flow rate to meet the sulfur specification in the re-absorber overhead gas. As shown in FIG. 1, for a certain case employing a solvent and sulfur specification of 30 mol % in acid gas, the required nitrogen flow rate increases linearly with the increase of the re-absorber overhead pressure (P in FIG. 1). While the sulfur content in the re-absorber overhead gas (vent in FIG. 1), which determines the required solvent flow rate, decreases rapidly with the increase of the re-absorber pressure at the lower pressure range, then its change becomes flat when the pressure is higher than approximately 414 kPa (60 psia). Therefore, approximately 414 kPa (60 psia) is an optimal (balanced) operating pressure of the re-absorber for this case.

The following Table shows the results of another study comparing different pressure configurations of the re-absorber and the integrated sulfur-rich solvent flash drum and illustrating the effect of cooling of the rich flash gas (or recycle as in the Table), the overhead gas of the sulfur-rich solvent flash drum that is sent back to the re-absorber. The sulfur specification in the acid gas stream is 30 mol % and the sulfur specification in the re-absorber overhead stream ($CO_2$ vent as in the Table) is 16 mole ppm for the case studied in the Table. It can be seen from the Table that at the re-absorber pressure of 414 kPa (60 psia) and the sulfur-rich solvent flash drum (rich flash in the Table) pressure of 448 kPa (65 psia) and without cooling of the recycle gas (Run 2) the required nitrogen stripping flow rate is 230.4 kgmol/hr (508 lbmol/hr) and the required solvent flow rate is 742.5 kgmol/hr (1637 lbmol/hr) to meet the specifications. When the re-absorber and the sulfur-rich solvent flash drum run at lower pressure—386 kPa (56 psia) and 421 kPa (61 psia), respectively—and without cooling of the recycle gas (Run 6), no nitrogen stripping is required and the required solvent rate is still 742.5 kgmol/hr (1637 lbmol/hr), which is an optimal configuration. The cooling of the rich flash gas, which requires higher pressure setting of the sulfur-rich solvent flash drum to overcome the pressure drop of the rich flash gas cooler, has no benefit as in this particular case. Different cases may show otherwise. This can be seen by comparing Runs 1 and 2 and Runs 4 and 5.

head, can have very low temperatures. The cold gas in those streams can be utilized to cool other process streams in the unit that requires low temperature, such as the lean solvent, to reduce the utilities that are required to cool the other process streams.

In one example, the MP $CO_2$ flash drum overhead has the temperature of $-12°$ C. (10.4° F.), the LP $CO_2$ flash drum overhead $-17.2°$ C. (1.0° F.), and the re-absorber overhead $-14.8°$ C. (5.4° F.). They are used to cool the lean solvent from 4.1° C. (39.3° F.) to 1.72° C. (35.1° F.). The utilization of the heat exchanges between the three carbon dioxide streams and the lean solvent can reduce the chilling duty of the lean solvent chiller by 17%.

The temperatures of the carbon dioxide streams, MP carbon dioxide flash drum overhead, LP carbon dioxide flash drum overhead and re-absorber overhead, after heat-exchanges with the lean solvent, are still low ($\leq 1.66°$ C. (35° F.) in the above example). Those carbon dioxide streams can be further used to cool other hot process streams when the pressures of the carbon dioxide streams permit to do so, such as to cool carbon dioxide recycle stream and rich flash gas. The further cooling of other hot process streams with the carbon dioxide streams can save totally or partially the utilities associated with the air or water coolers required to cool the hot process streams if no heat exchanges with the

TABLE

| Run | Re-absorber pressure, kPa (psia) | Rich flash pressure, kPa (psia) | Temperature recycle cooled to, ° C. | $N_2$, kgmol/hr (lbmol/hr)/sulfur in acid gas, mol % | Sulfur in $CO_2$ vent, ppm | Solvent flow, kgmol/hr (lbmol/hr) |
|---|---|---|---|---|---|---|
| 1 | 414 (60) | 475 (69) | 40 | 726.7 (1602)/30% | 16 | 816.5 (1800) |
| 2 | 414 (60) | 448 (65) | no cooling | 230.4 (508)/30% | 15.8 | 742.5 (1637) |
| 3 | 345 (50) | 379 (55) | no cooling | no/34.4% | 32.3 | 742.5 (1637) |
| 4 | 379 (55) | 414 (60) | no cooling | no/31.5% | 17.3 | 742.5 (1637) |
| 5 | 379 (55) | 448 (65) | 40 | 145.6 (321)/30% | 21.8 | 742.5 (1637) |
| 6 | 386 (56) | 421 (61) | no cooling | no/31% | 15.8 | 742.5 (1637) |

With optimal pressure configuration of the integrated re-absorber and sulfur-rich solvent flash drum, the nitrogen stripping gas can be avoided for certain application cases. This and the elimination of the rich flash gas compressor and associated knock-out drum and cooler improve the economy of an acid gas removal process. One example showed that, by eliminating the nitrogen stripping only, 1.3 MM US$/year saving in operating expenses can be achieved.

For an integrated re-absorber and sulfur-rich solvent flash drum system, since the pressure of the sulfur-rich solvent flash drum is higher than that of the re-absorber, a pump is required to send the sulfur-rich solvent from the bottom of the re-absorber to the sulfur-rich solvent flash drum and a pump may be needed from the sulfur-rich solvent flash drum to the regenerator.

In addition to improving process economy, eliminating the use of nitrogen striping also make it possible to have the re-absorber overhead as carbon dioxide product, even when nitrogen is not allowed in the product.

In some cases, totally eliminating the nitrogen stripping may not by possible, but the required nitrogen flow rate and solvent flow rate for the re-absorber can be optimized by configuring the pressure of the re-absorber and the sulfur-rich solvent flash drum as illustrated above. In a acid gas removal process unit, $CO_2$ containing or $CO_2$-rich streams, which may include the streams of medium-pressure (MP) carbon dioxide flash drum overhead, low pressure (LP) carbon dioxide flash drum overhead, and re-absorber over-carbon dioxide streams are applied or may further lower the temperatures of the hot streams in addition to air or water cooling if desired.

Figure 2:
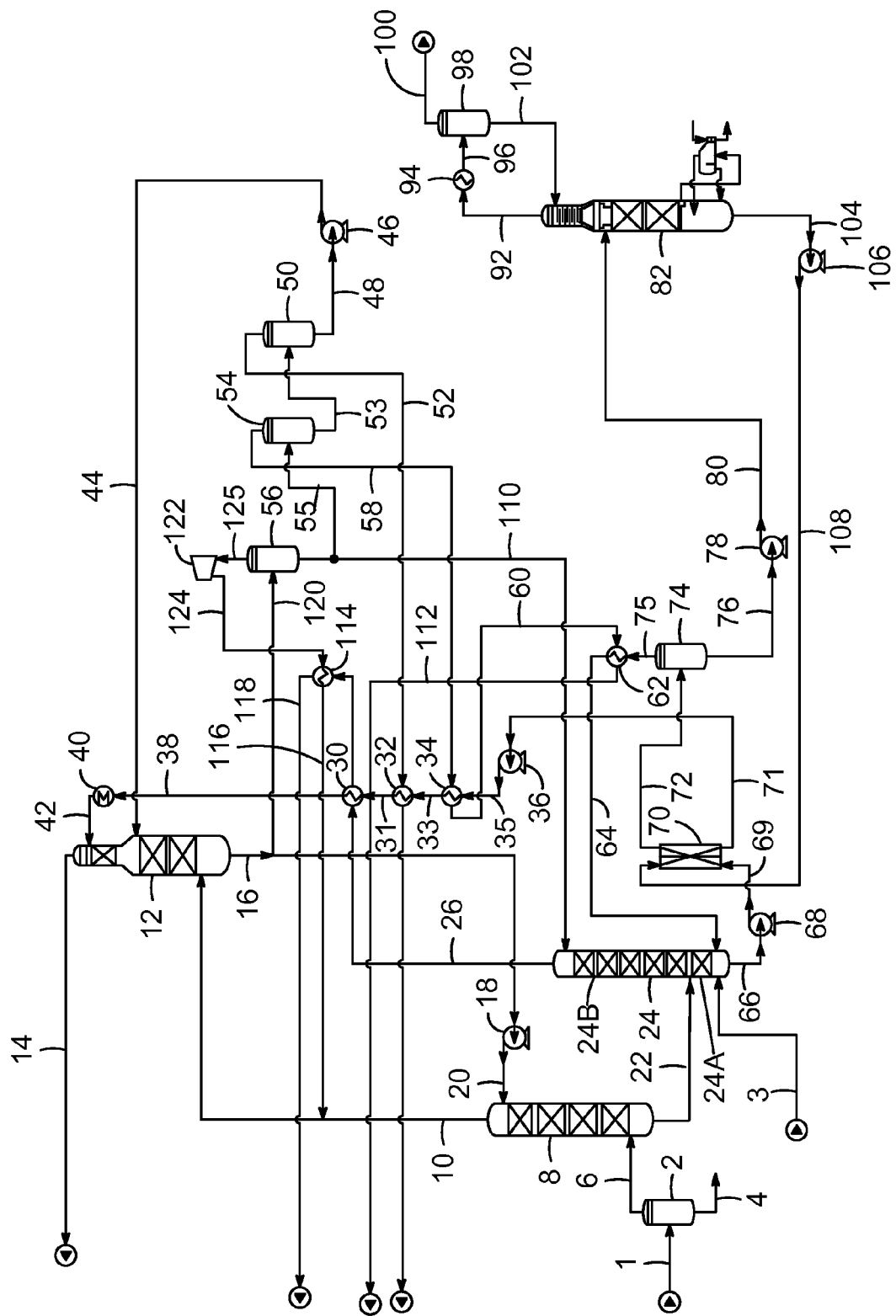
FIG. 2 is an exemplary schematic for an acid gas removal system and process having a low pressure re-absorber integrated with a sulfur-rich solvent flash drum and having configurations that allow various $CO_2$-containing or $CO_2$-rich gas streams to cool other streams, according to this invention.

FIG. 2 shows the system and process of the present invention that is used to process a sour gas feed 1 that is shown going to a vapor-liquid separator, shown as feed gas knock-out drum 2 with liquids 4 being removed and a sour vapor gas 6 going to a sulfur absorber 8. A treated gas 10 that is now low in sulfur optionally goes to carbon dioxide absorber 12 in the $CO_2$ absorption section for removal of carbon dioxide. A treated gas 14 is removed from the system. A stream 16 that contains a higher concentration of carbon dioxide is sent either to stream 120 or is returned to sulfur absorber 8 after passing through pump 18 and line 20. The portion that becomes stream 120 is first shown going to carbon dioxide recycle flash drum 56. A solvent stream that is loaded with carbon dioxide is either sent through line 110 to re-absorber 24 or is sent to a medium pressure $CO_2$ flash drum 54 through line 55. Liquid 53 removed from medium pressure flash drum 54 then is sent to low pressure $CO_2$ flash drum 50 and the liquid stream 48, now is regenerated and low in $CO_2$ concentration, then goes to pump 46 and returns to carbon dioxide absorber 12 through line 44. A vapor stream rich in carbon dioxide 52 is sent from low pressure flash drum 50 through a heat exchanger 32 to heat-exchange with the lean solvent 33 then is sent out of the system as $CO_2$ product or vent. A $CO_2$-rich vapor stream 58 is sent from medium pressure flash drum 54 to heat exchanger 34 to heat-exchange with the lean solvent 35, then goes to heat exchanger 62 through line 60 to further heat-exchange with rich flash gas 75 then goes to carbon dioxide product or vent stream 112. A $CO_2$ recycle vapor stream 125 exits carbon dioxide recycle flash drum 56 to compressor 122 to compressed $CO_2$ recycle stream 124 to heat exchanger 114 and then mixes with treated gas 10 then goes to carbon dioxide absorber 12. A sulfur-rich solvent stream 22 goes from sulfur absorber 8 to the top of the bottom part 24A of re-absorber 24. In the bottom part 24A of re-absorber 24, carbon dioxide is stripped off from the sulfur-rich solvent 22 by rich flash gas 64 and optionally also by nitrogen 3. The vapor from the bottom part 24A to the upper part 24B of the re-absorber 24 also contains sulfur-containing components, which is contacted with $CO_2$-loaded solvent 110 in the upper part 24B of re-absorber 24 to remove sulfur-containing components. A $CO_2$-containing vapor stream 26 from the overhead of the upper part 24B of re-absorber 24 is sent to heat exchanger 30 to heat-exchange with lean solvent 31, then goes to heat exchanger 114 to further heat-exchange with compressed $CO_2$ recycle stream 124, then is sent out of the system as $CO_2$ vent or product. A sulfur-rich solvent stream with higher sulfur concentration 66 exits the bottom of the bottom part 24A of re-absorber 24 to pump 68 to a lean-rich heat exchanger 70. After heat-exchanges with the lean solvent 108, the sulfur-rich solvent stream is sent through line 72 to sulfur-rich solvent flash drum 74. A vapor stream containing carbon dioxide and some sulfur-containing components 75, which is named rich flash gas, leaves the overhead of sulfur-rich solvent flash drum 74, heat-exchanges with the $CO_2$-rich vapor stream 60 in heat exchanger 62, then is sent back to the bottom part 24A of re-absorber 24 through line 64. A sulfur-rich solvent stream 76 exits the bottom of sulfur-rich solvent flash drum 74 to pump 78 to line 80 to regenerator 82. Regenerator overhead stream 92 exits the top of regenerator 82 and then goes to a condenser 94 and then through line 96 to reflux drum 98. An acid gas stream 100 is shown leaving the system to be further treated in a sulfur recovery unit. A liquid stream 102 is returned to the top portion of regenerator 82. A lean solvent stream 104 exits the bottom of regenerator 82 and is sent to pump 106 to line 108 and then to the lean-rich heat exchanger 70. Then the lean solvent stream goes through line 71 to pump 36, line 35, heat exchanger 34 to line 33 to heat exchanger 32 to line 31 to heat exchanger 30 to line 38 to heat exchanger 40 to line 42 which then goes to carbon dioxide absorber 12. The lean solvent is heat-exchanged with the $CO_2$-rich or $CO_2$-containing streams from the MP $CO_2$ flash drum 54, the LP $CO_2$ flash drum 50 and the overhead of re-absorber 24 respectively in the heat exchangers 34, 32 and 30 as described earlier.

Figure 3:
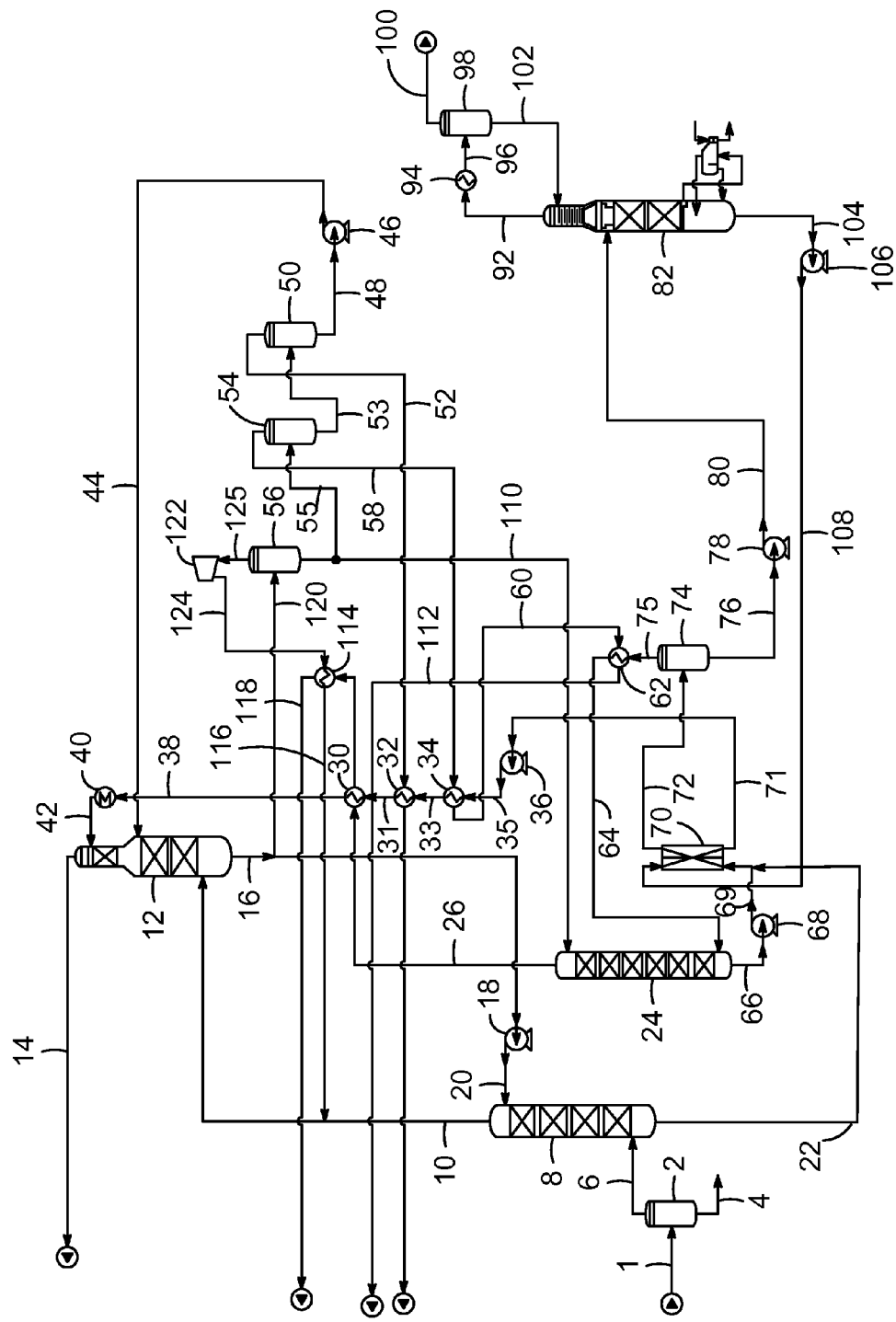
FIG. 3 is another exemplary schematic for an acid gas removal system and process having a low pressure re-absorber integrated with a sulfur-rich solvent flash drum and having configurations that allow various $CO_2$-containing or $CO_2$-rich gas streams to cool other streams, according to this invention.

FIG. 3 shows a system and process of the present invention that is used to process a sour gas feed which is similar to the system and process shown in FIG. 2 with the following differences: the sulfur-rich solvent stream 22 from sulfur absorber 8 goes to the lean-rich heat exchanger 70 versus to re-absorber 24 as in FIG. 2. Re-absorber has only one part versus two parts (bottom part and upper part) as in FIG. 2. No nitrogen stream (stream 3 as in FIG. 2) is sent to the re-absorber 24 as stripping gas.

Figure 4:
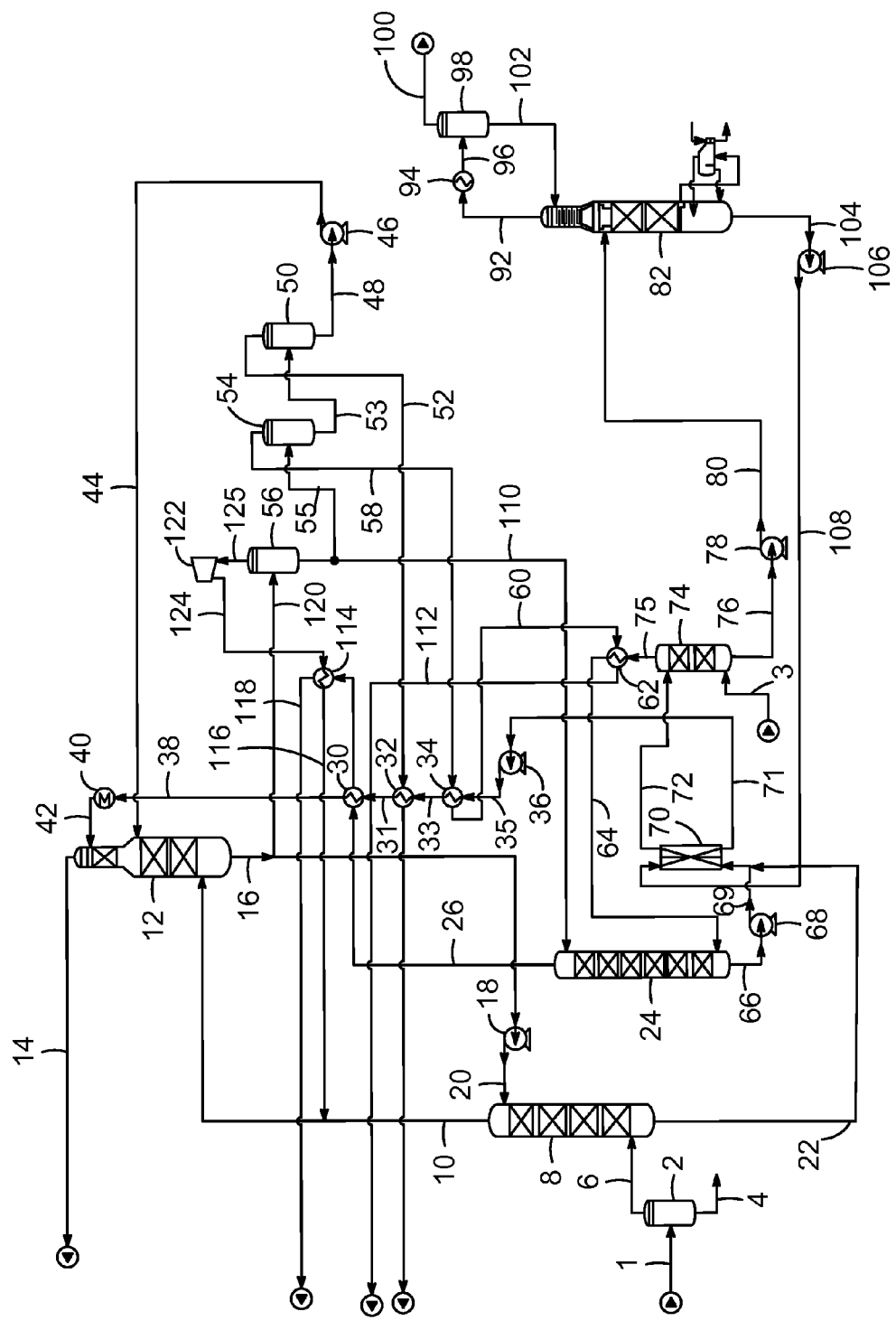
FIG. 4 is another exemplary schematic for an acid gas removal system and process having a low pressure re-absorber integrated with a sulfur-rich solvent stripping column (or stripper) and having configurations that allow various $CO_2$-containing or $CO_2$-rich gas streams to cool other streams, according to this invention.

FIG. 4 shows a system and process of the present invention that is used to process a sour gas feed which is similar to the system and process shown in FIG. 3 with the following differences: the sulfur-rich solvent flash drum 74 is replaced by a sulfur-rich solvent stripping column (or stripper) with nitrogen 3 as the stripping gas and the sulfur-rich solvent stream 72 feeds to the top of the stripper 74.

SPECIFIC EMBODIMENTS

While the following is described in conjunction with specific embodiments, it will be understood that this description is intended to illustrate and not limit the scope of the preceding description and the appended claims.

A first embodiment of the invention is a process for treating a gas stream comprising sending a gas stream to a sulfur absorption unit to contact with solvent to produce a sulfur-rich solvent stream and a sulfur-lean gas stream, sending the sulfur-rich solvent stream to a re-absorber unit and then to a sulfur-rich solvent flash drum, the overhead gas stream (rich flash gas) of the sulfur-rich solvent flash drum is sent to the re-absorber, to concentrate the sulfur content in the solvent, and to ensure the gas stream from the overhead of the re-absorber unit to meet required sulfur content specification by a solvent stream fed to the top of the re-absorber. An embodiment of the invention is one, any or all of prior embodiments in this paragraph up through the first embodiment in this paragraph wherein the sulfur-lean gas stream from the sulfur absorption unit is sent to a carbon dioxide absorption section to further remove carbon dioxide. An embodiment of the invention is one, any or all of prior embodiments in this paragraph up through the first embodiment in this paragraph wherein the process operates without nitrogen stripping in the re-absorber. An embodiment of the invention is one, any or all of prior embodiments in this paragraph up through the first embodiment in this paragraph wherein the re-absorber unit and the sulfur-rich solvent flash drum operate at a lower pressure than a process in which a nitrogen stripping gas stream is used. An embodiment of the invention is one, any or all of prior embodiments in this paragraph up through the first embodiment in this paragraph wherein the re-absorber unit operates at a low pressure and is integrated with the sulfur-rich solvent flash drum, so that there is no compressor required to send the overhead rich flash gas from the sulfur-rich solvent flash drum to the re-absorber. An embodiment of the invention is one, any or all of prior embodiments in this paragraph up through the first embodiment in this paragraph wherein the sulfur-rich solvent flash drum operates at a pressure that is slightly higher than a pressure that the re-absorber unit operates at to overcome any pressure drop for the rich flash gas from the overhead of the sulfur-rich solvent flash drum to the re-absorber. An embodiment of the invention is one, any or all of prior embodiments in this paragraph up through the first embodiment in this paragraph wherein there is one or more heat exchangers and/or one or more coolers between the overhead of the sulfur-rich solvent flash drum and the re-absorber to cool the rich flash gas from the overhead of the sulfur-rich solvent flash drum. An embodiment of the invention is one, any or all of prior embodiments in this paragraph up through the first embodiment in this paragraph wherein the bottom part and the upper part of the re-absorber unit are two separate columns. An embodiment of the invention is one, any or all of prior embodiments in this paragraph up through the first embodiment in this paragraph wherein the solvent to the re-absorber unit is from the bottom of the $CO_2$ recycle flash drum. An embodiment of the invention is one, any or all of prior embodiments in this paragraph up through the first embodiment in this paragraph wherein the solvent to the re-absorber unit is from the bottom of the MP $CO_2$ flash drum. An embodiment of the invention is one, any or all of prior embodiments in this paragraph up through the first embodiment in this paragraph wherein the solvent to the re-absorber unit is from the bottom of the LP $CO_2$ flash drum. An embodiment of the invention is one, any or all of prior embodiments in this paragraph up through the first embodiment in this paragraph wherein the sulfur-rich solvent stream from sulfur absorption unit goes to the lean-rich heat exchanger and not to the re-absorber. An embodiment of the invention is one, any or all of prior embodiments in this paragraph up through the first embodiment in this paragraph wherein the sulfur-rich solvent flash drum is replaced by a sulfur-rich solvent stripper. An embodiment of the invention is one, any or all of prior embodiments in this paragraph up through the first embodiment in this paragraph wherein the re-absorber unit operates at a pressure of about 386 kPa. An embodiment of the invention is one, any or all of prior embodiments in this paragraph up through the first embodiment in this paragraph wherein the sulfur-rich solvent flash drum operates at a pressure of about 421 kPa.

Another embodiment of the invention is a process of acid gas removal by solvent where the lean solvent is cooled by the $CO_2$-rich or $CO_2$-containing gas streams from the MP $CO_2$ flash drum, the LP $CO_2$ flash drum, and the overhead of the re-absorber respectively in a series of heat exchangers. An embodiment of the invention is one, any or all of prior embodiments in this paragraph up through the first embodiment in this paragraph wherein the lean solvent is cooled by the $CO_2$-rich or $CO_2$-containing gas streams from one or two of the sources listed in the above embodiment. An embodiment of the invention is one, any or all of prior embodiments in this paragraph up through the first embodiment in this paragraph wherein the $CO_2$-rich gas stream from the MP $CO_2$ flash drum, after cooling the lean solvent, is used to further cool the rich flash gas from the sulfur-rich solvent flash drum. An embodiment of the invention is one, any or all of prior embodiments in this paragraph up through the first embodiment in this paragraph wherein the $CO_2$-containing gas stream from the re-absorber overhead, after cooling the lean solvent, is used to further cool the $CO_2$ recycle stream from the $CO_2$ recycle flash drum.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by mole, unless otherwise indicated.

The invention claimed is:

1. A process for treating a gas stream using solvent comprising sending a feed gas stream to a sulfur absorption unit to produce a sulfur-rich solvent stream and a sulfur-lean gas stream, sending the sulfur-rich solvent stream to a re-absorber unit and then to a sulfur-rich solvent flash drum, sending the overhead gas from the sulfur-rich solvent flash drum to the re-absorber unit, and feeding a solvent stream to the top of the re-absorber unit to produce a re-absorber overhead gas stream that is lean in sulfur.

2. The process of claim 1 wherein the sulfur-lean gas stream from the sulfur absorption unit is sent to a carbon dioxide absorption section to further remove carbon dioxide.

3. The process of claim 1 wherein the process operates without nitrogen stripping in the re-absorber unit.

4. The process of claim 1 wherein the re-absorber unit and the sulfur-rich solvent flash drum operate at pressures so that there is no compressor required to send the overhead gas from the sulfur-rich solvent flash drum to the re-absorber unit.

5. The process of claim 1 wherein there is one or more heat exchangers and/or one or more coolers between the overhead of the sulfur-rich solvent flash drum and the re-absorber to cool the overhead gas from the sulfur-rich solvent flash drum.

6. The process of claim 1 wherein said re-absorber unit operates at a pressure in the range from about atmospheric pressure to about two-thirds of the operating pressure of the sulfur absorption unit.

7. The process of claim 1 wherein the solvent fed to the top of the re-absorber is a solvent that is lean in sulfur and loaded with carbon dioxide.

8. The process of claim 1 wherein the solvent fed to the top of the re-absorber is a solvent that is lean in sulfur and lean in carbon dioxide.

9. The process of claim 1 wherein a lean-rich heat exchanger is used in the liquid line from the re-absorber to the sulfur-rich solvent flash drum where the sulfur-rich solvent is heated by the lean solvent.

10. The process of claim 1 wherein the overhead gas stream from the re-absorber is used to cool the lean solvent and/or to cool other process streams.

11. A process for treating a gas stream using solvent comprising sending a feed gas stream to a sulfur absorption unit to produce a sulfur-rich solvent stream and a sulfur-lean gas stream, sending the sulfur-rich solvent stream to a separation unit, sending the overhead gas from the separation unit to a re-absorber unit, and feeding a solvent stream to the top of the re-absorber unit to produce a re-absorber overhead gas stream that is lean in sulfur wherein the solvent fed to the top of the re-absorber is a solvent that is lean in sulfur and loaded with carbon dioxide.

* * * * *